US005257176A

United States Patent [19]

Uetani

[11] Patent Number: 5,257,176

[45] Date of Patent: Oct. 26, 1993

[54] CONTROL OPERATION SPECIFICATION SETTING APPARATUS FOR AN ELEVATOR

[75] Inventor: Kenichi Uetani, Inazawa, Japan

[73] Assignee: Mitsubishi Denki Kabushiki Kaisha, Tokyo, Japan

[21] Appl. No.: 514,741

[22] Filed: Apr. 26, 1990

[30] Foreign Application Priority Data

May 19, 1989 [JP] Japan ................................ 1-124487

[51] Int. Cl.[5] ........................ G05B 13/02; G05B 17/42

[52] U.S. Cl. .................................... 364/148; 364/140; 364/192; 187/130

[58] Field of Search ................ 364/133, 138, 140–146, 364/148, 188, 189, 191, 192; 187/100–102, 124, 130, 121, 127–129, 133

[56] References Cited

U.S. PATENT DOCUMENTS 4,410,959 10/1983 Tajima et al. ....................... 187/102
4,690,243 9/1987 Ichioka ............................... 187/101
4,719,993 1/1988 Ujihara ............................... 187/101
4,742,894 5/1988 Ujihara ............................... 187/136
4,802,082 1/1989 Uetani ................................ 364/138
5,010,472 4/1991 Yoneda et al. ...................... 187/130

FOREIGN PATENT DOCUMENTS 59-31267 2/1984 Japan .
59-39664 3/1984 Japan .
2128369 4/1984 United Kingdom ............... 187/101

*Primary Examiner*—Jerry Smith
*Assistant Examiner*—Thomas E. Brown
*Attorney, Agent, or Firm*—Leydig, Voit & Mayer

[57] ABSTRACT

An apparatus for setting a control operation specification for an elevator. The apparatus includes an operation specification storage device for storing a plurality of operation specifications used to control the elevator, a setting condition storage device for storing setting conditions, a display device for displaying the operation specifications as well as the setting conditions which determine how the operation specifications can be modified, an input device for inputting a modified operation specification, and a determination device for determining whether or not the operation specification stored in the operation specification storage device can be modified to the operation specification which has been input from the input device on the basis of the setting conditions stored in the setting condition storage device and the present operation specification.

16 Claims, 11 Drawing Sheets

| NO | OPERATION SPECIFICATION ITEM | CONTENTS |
|---|---|---|
| 1 | OPERABILITY/INOPERABILITY OF THE SERVICE | 1 |
| 2 | NUMBER OF CARS RETURNED | 2 |
| 3 | STARTING TIME | 08:30 |
| 4 | ENDING TIME | 09:10 |
| 5 | MAIN FLOOR | 1 |

CONTROL OPERATION SPECIFICATION SETTING APPARATUS FOR AN ELEVATOR

BACKGROUND OF THE INVENTION

1. Field of the Invention

The present invention relates to an operation specification setting apparatus for an elevator, and more particularly, to an apparatus for externally setting and changing the operation specification for an elevator.

2. Description of the Related Art

In a case where elevators are conventionally controlled using a microcomputer, they are controlled in accordance with the program stored in a read-only memory. Such a program is a standard program which performs basic operations.

When elevators are shipped from a plant, it is required that the control operation specification be set in accordance with the buildings where the elevators are to be installed.

Both the standard program for an elevator and the control operation Specification thereof which is set for each building are registered and managed by an elevator plant or an elevator maintenance company.

Conventional control operation specification setting apparatuses for an elevator include the control apparatus for an elevator which is disclosed by Japanese Patent Laid-Open No. 31267/1984 and that described in Japanese Patent Laid-Open No. 39664/1984.

In the former control apparatus, a plurality of control operation specification data are previously stored in the form of a table in a ROM. Part of the control operation specification data is selected from the data stored in the ROM by the operation of a switch, and the selected control operation specification data is reset in a non-volatile RAM. Control of the operation of the elevator is performed in accordance with the reset operation specification data.

In the latter control apparatus for an elevator, the control operation specification data which are previously prepared in a ROM are copied to a RAM which is backed up with temporary battery-power supplies or in a non-volatile RAM. The copied control operation specification data are corrected by the operation of a switch.

Some items in the control operation specification can be changed in accordance with the application of an elevator.

Hence, the control operation specification may be changed not only when the elevator is delivered but also after the elevator has been delivered. In the latter case, a maintenance man changes the control operation specification by the operation of external switches provided in a machine room for the elevator. However, it may be difficult to cope with the demands of changing the elevator control operation specification quickly, in a case where the such demands occur frequently.

In order to cope with increasing demands of changing the control operation specification for the elevator, there has been a strong demand of changing the control operation specification easily by a customer. This may be achieved by the use of a laptop type personal computer as an interactive terminal of the control apparatus for an elevator.

The items of the control operation specification that can be changed by using a laptop type personal computer include the data which is related to safety, such as the opening/closing control of an elevator door and control of a motor, and that on the optional functions.

However, when a certain item of the control operation specification is to be changed, the range within which the the parameters determining that item of the control operation specification can be changed may be limited by a set state of another item of the control operation specification or by the specification of external devices. If the parameters are set outside of the limited range, the performance of the elevator may be reduced or malfunctioning of the elevator may occur.

Thus, changes in the control operation specification for an elevator require expert knowledge, and are therefore conventionally dependent on the integral judgement of a technician skilled in regard to elevator system operations, even if the changes are not associated with a safety problem or even if there is a building caretaker.

In other words, conventionally, the control operation specification for an elevator can be set or changed only by those who have expert knowledge of elevators.

SUMMARY OF THE INVENTION

The present invention is directed toward the elimination of the aforementioned problems of the prior art, and an object thereof is to provide an apparatus for setting a control operation specification for an elevator which allows a user who does not have expert knowledge of elevators to set and change the operation specification easily and with a high degree of accuracy.

To this end, the present invention provides an apparatus for setting a control operation specification for an elevator which includes a storage device for storing operation specifications used to control the elevator and for storing setting condition data and alteration range data indicating which operation specifications in the storage device can be altered. A transmission device is included for receiving new operation specifications. A CPU, coupled to the storage device and the transmission device, updates the operation specifications stored in the storage device with the new operation specifications received from the transmission device provided that the alteration range data indicates that the new operation specifications are for updating operation specifications in the storage device which can be altered and provided that the new operation specifications are within a predetermined range specified by the setting condition data stored in the storage device. Additionally, the CPU, the storage device, and the transmission device comprise a group management control device.

DESCRIPTION OF THE PREFERRED EMBODIMENT

Figure 1:
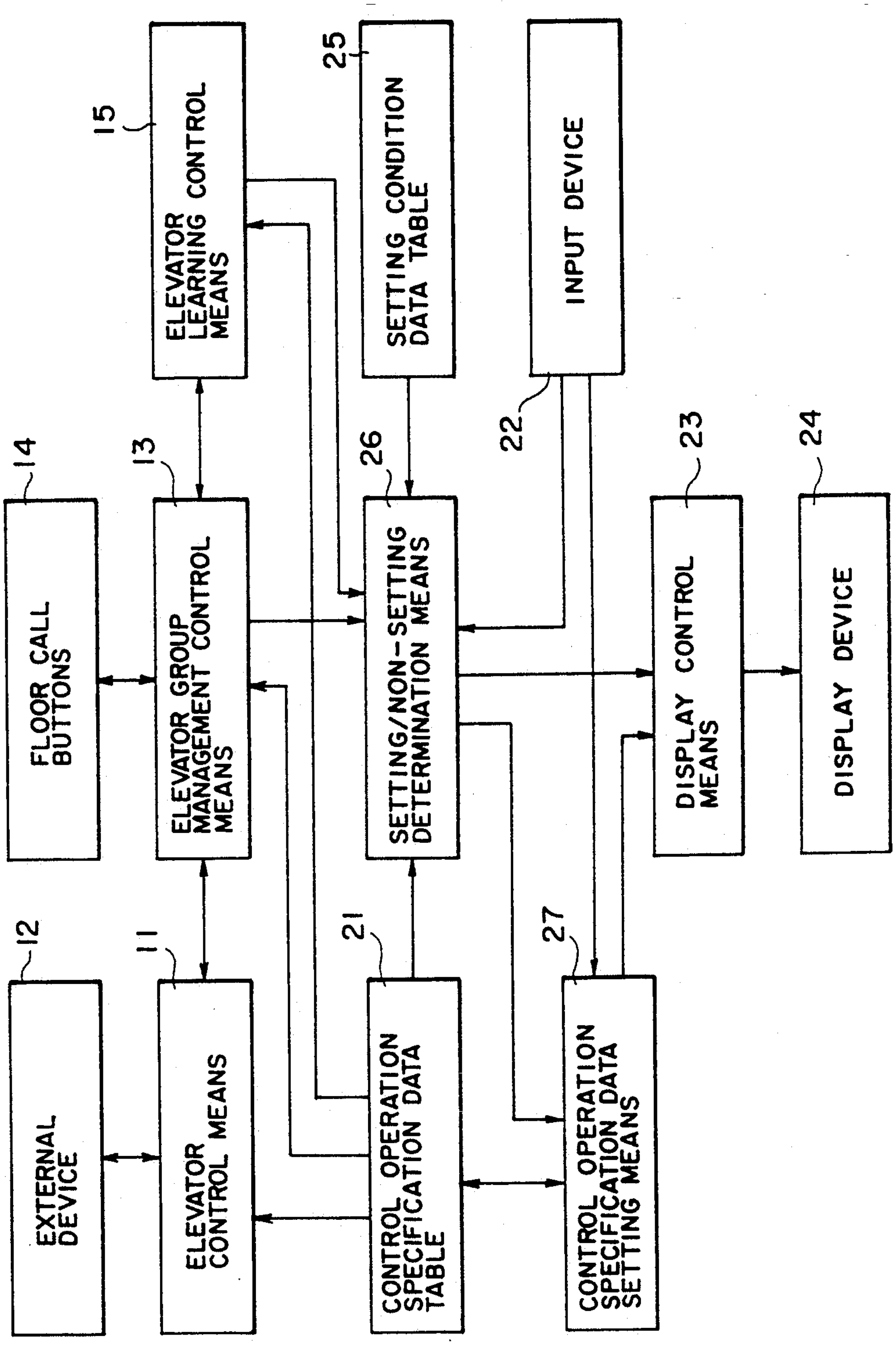
FIG. 1 is a block diagram of an elevator control operation specification setting apparatus according to the present invention.

Referring first to FIG. 1, a control operation specification setting apparatus includes an elevator control means 11 coupled to an elevator group management control means 13 and an external device 12 such as destination floor buttons. The elevator group management control means 13 is coupled to floor call buttons 14 and an elevator learning control means 15 for forecasting the future traffic of the elevators from the past traffic.

The control operation specification setting apparatus also includes a control operation specification data table 21 connected to the elevator control means 11, the elevator group management control means 13, the elevator learning control means 15, and a setting/non-setting determination means 26 for determining whether or not the control operation specification can be changed or corrected. The setting/non-setting determination means 26 is connected to the elevator group management control means 13, the elevator learning control means 15, the control operation specification data table 21, a setting condition data table 25 for storing the setting conditions of the control operation specification, a control operation specification data setting means 27 for changing or correcting the contents of the control operation specification data table 21, and a display control means, and an input device. The control operation specification data setting means 27 is connected to the control operation specification data table 21, the setting/non-setting determination means 26, an input device 22, and a display device 24 through a display control means 23. The input device 22 may be a laptop type personal computer or dedicated switches, and the display device 24 may be a CRT for the computer which acts as the input device 22 or a dedicated LED.

The control operation specification data table 21 contains data for defining basic operations and those for defining optional functions as outlined below.

(1) Data For Defining Basic Operations (a) Data representing the riding capacity of an elevator, the type (performance) of a lifting motor and so on.

(b) Data required for controlling the speed of an elevator, such as the distance between the adjacent floors, the acceleration and rated speed for the elevator.

(c) Data required for the car management, such as the type of a door, a number of floors at which the elevator is stopped, the floors of a building and the floors at which the elevator can be stopped.

(d) Data required for the group management control, such as a number of rows of call, a number of cars and a main floor.

(e) Data required for the learning control (part of the data designated in items (a) to (d))

(2) Data For Defining Optional Functions (a) Data regarding the separate operation function for special visitors which is controlled separately from the group management control, the function of automatically cancelling the mischievous calling of a car, the function of instantaneously guiding (forecasting) an allocated car and so on.

(b) Data regarding the running pattern function in the group management control, such as the rush hour operation service and the lunch time operation service, the service separation function by a switch, the energy-saving operation function and so on.

(c) Data representing the detailed specification for the aforementioned control operation data, such as the designation of the number of cars which are returned to the main floor during the rush hour operation service.

The range within which the control operation specification regarding the aforementioned optional functions can be changed is designated for each elevator.

The above-described control operation specification data table 21 lists the operation items in a state where they are classified in accordance with their contents. However, some items are listed in an overlapped fashion.

As to whether the contents of the control operation specification data table 21 can or cannot be changed is indicated by alteration range data. This alteration range data is set for each control operation specification data. It is listed in the form of a table. "Yes" is given to the control operation specification data that can be altered, and "No" is set for the control operation specification data that cannot be altered.

The alteration range data is written in a ROM in a factory before the delivery of an elevator.

The control operation specification data table 21 contains the initial data prior to the installation of the corresponding elevator. The initial data in the control operation specification data table 21 is corrected or altered by means of the control operation specification data setting means 27 on the basis of the alteration range data at the time of installation of the elevator. Hence, the elevator is controlled using the corrected or altered contents of the control operation specification data table 21.

Control of the elevator which is based on the contents of the control operation specification data table 21 is performed by means of the elevator control means 11, the elevator group management control means 13 and the elevator learning control means 15, description of the details of this control being omitted.

The setting/non-setting determination means 26 compares the data in the control operation specification data table 21, the data in the elevator group management control means 13 and that in the elevator learning control means 15 with each other on the basis of the contents of the setting condition data table 25 when it receives a request for changing the control operation specification from the input device 22, and thereby determines whether or not the control operation specification can be changed.

The control operation specification data setting means 27 resets the control operation specification data table 21 in accordance with the control operation specification to be changed which is given by the setting/non-setting determination means 26 when the setting/non-setting determination means 26 determines that the control operation specification can be changed. In that case, the items of the operation to be changed are selected by referring to the alteration range data.

Figures 2, 2A:
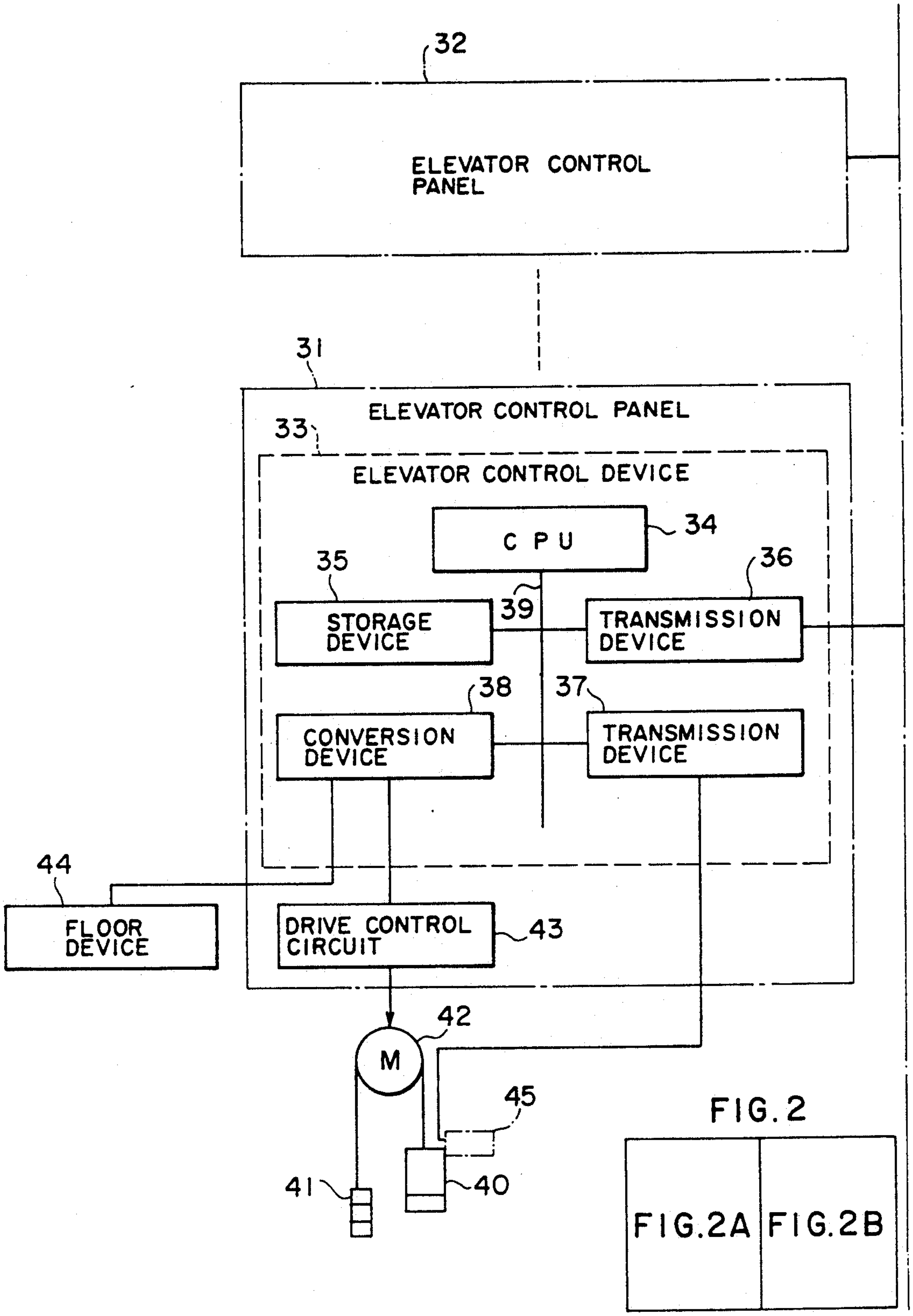
FIGS. 2A and 2B are block diagrams of an embodiment of the operation specification setting apparatus according to the present invention.
Figure 2B:
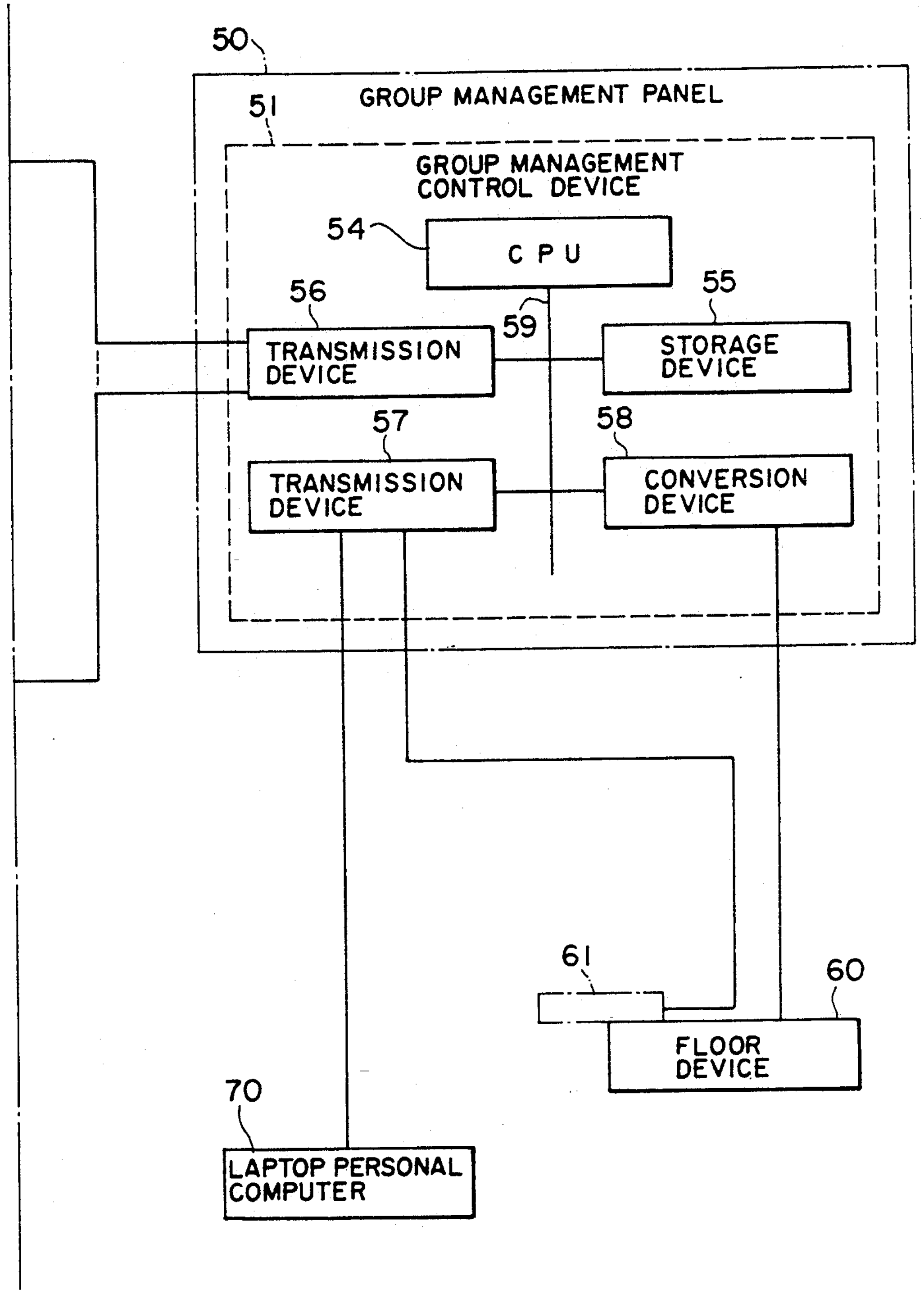

FIG. 2 is a block diagram of the practical form of the control operation specification setting apparatus for an elevator shown in FIG. 1.

In FIG. 2, the apparatus includes elevator control panels 31 and 32, and an elevator control device 33 which is a microcomputer incorporated in the elevator control panel 31.

The elevator control device 33 is comprised of a CPU 34, a storage device 35 which may be composed of an EPROM and a RAM, serial transmission devices 36 and 37 which may be made of an interface 8251 manufactured by Intel, a conversion device 38 which interfaces with an external device by converting an output signal or an input signal into a voltage, and an internal bus line 39.

Part of the RAM which is the component of the storage device 35 is backed up with temporary battery-power supplies.

The apparatus also includes an elevator car 40, a balance weight 41, a lifting motor 42, a drive control circuit 43 for controlling the lifting motor 42 to control the elevation of the elevator car 40 and the balance weight 41, a floor device 44 such as a hall lantern, a car top control device 45 which has the same configuration as that of the elevator control device 33, an elevator group management panel 50, and a group management control device 51 which is a microcomputer incorporated in the elevator group management panel 50.

The group management control device 51 is comprised of a CPU 54, a storage device 55, serial transmission devices 56 and 57, a conversion device 58 and an internal bus line 59, like the elevator control device 33.

The apparatus further includes a floor device 60 such as call buttons provided on each floor, a floor control device 61 which is the same microcomputer as that which constitutes the elevator control device 33, the floor control device 61 supplying information to the group management control device 51 and controlling the floor device by the instruction from the group management control device 51, e.g., calling the floor, and a laptop type personal computer 70 which forms the input device 22, the display control means 23 and the display device 24 shown in FIG. 1.

Although a present embodiment employs the laptop type personal computer 70, a dedicated device or types of computer may also be employed. The laptop type personal computer 70 may be installed in a caretaker chamber, a disaster prevention center or a secretary room so that the user can freely operate it.

The programs and data which realize the various types of means shown in FIG. 1 are stored in a ROM or a RAM in the storage devices 35 and 55. More specifically, the elevator control means 11 is stored in the ROM in the storage device 35. The elevator group management control means 13, the elevator learning control means 15, the setting condition data table 25, the alteration range data table and the setting/non-setting determination means 26 are stored in the ROM in the storage device 55. The control operation specification data table 21 is stored in the RAM in the storage device 55.

The display control means 23 and the control operation specification data setting means 27 are stored in a storage device in the laptop personal computer 70.

Next, the operation of the operation specification setting apparatus shown in FIGS. 1 and 2 will be described with reference to FIGS. 3 to 8.

Figure 3:
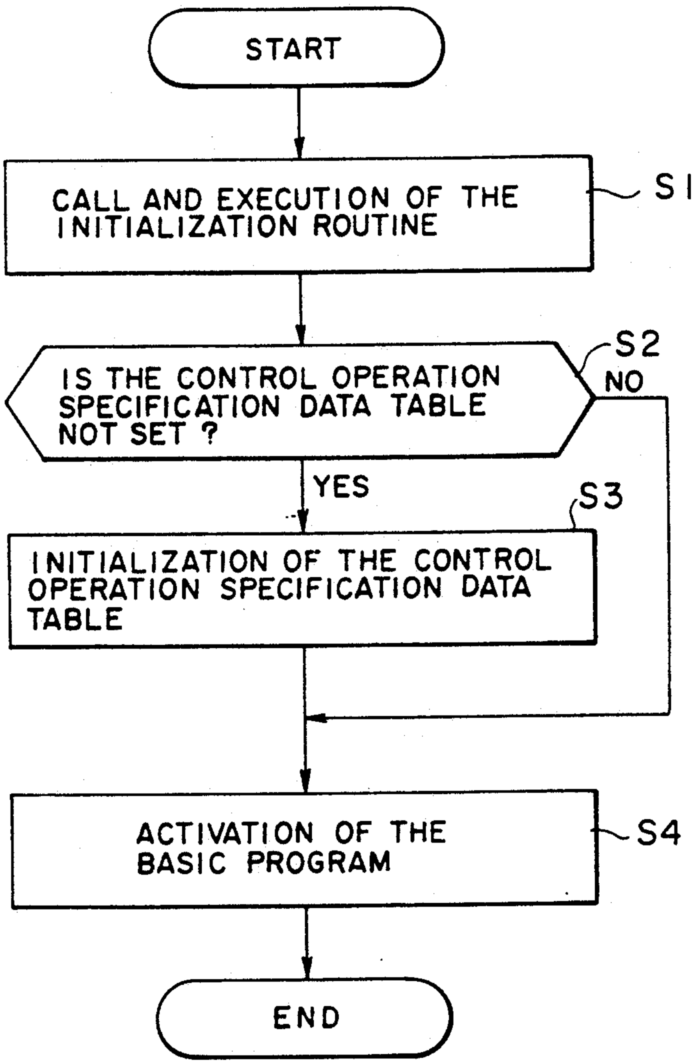
FIG. 3 is a flowchart of an activating program executed in the embodiment of FIGS. 2A and 2B.

In step S1 shown in FIG. 3, the CPU 54 in the group management control device 51 performs an initialization routine, i.e., the CPU 54 initializes the RAM in the storage device 55, sets the peripheral LSI and hardware, and sets the initial values of the data required for the program.

Next, the CPU 54 determines in step S2 whether or not the control operation specification data table 21 is set from the state of a switch (not shown) provided in the elevator group management panel 50.

If the control operation specification data table 21 is not set, the CPU 54 transfers the initial control operation specification data stored in the ROM in the storage device 55 to the control operation specification data table 21 in step S3 to set the table 21.

The control operation specification data table 21 is stored in the RAM in the storage device 55 which is backed up with temporary battery-power supplies. If the table is initialized by power supplied from the power source, the contents of the table are destroyed on the removal of power to the RAM.

Next, the CPU 54 activates a scheduler for activating the required processing programs in step S4. The scheduler, which is usually called the basic program, manages all the programs which are executed by the CPU 54.

The scheduler is activated by interrupts which are initiated periodically (e.g., at intervals of 0.1 second) by a timer. When a plurality of tasks are to be activated concurrently, they are executed apparently in parallel and concurrently by time slicing.

Figure 4:
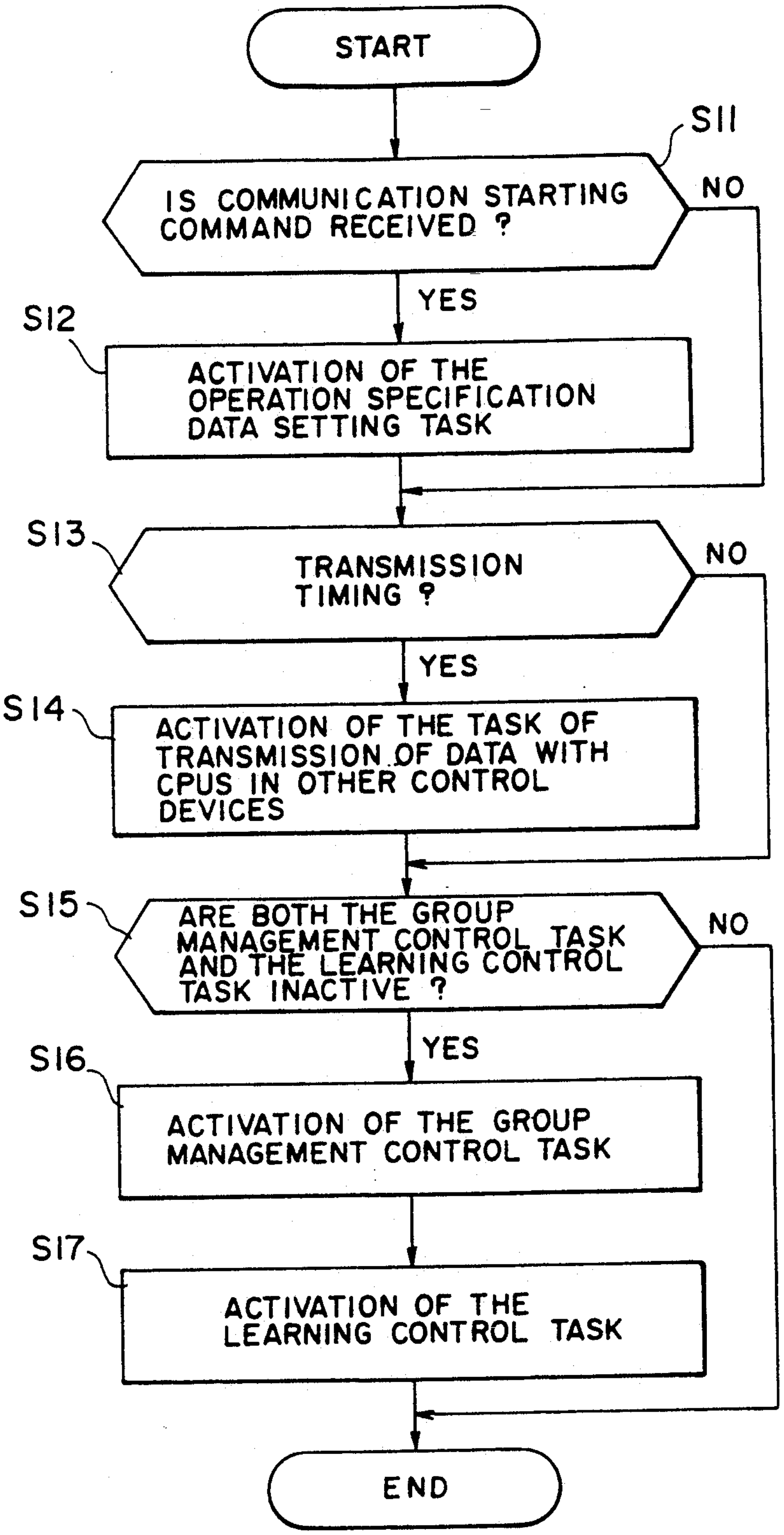
FIG. 4 is a flowchart of a scheduler in the embodiment of FIGS. 2A and 2B.

The scheduler executes the processing from steps S11 to S17 shown in FIG. 4.

Once the CPU 54 receives a communication starting command which is output from the laptop personal computer 70 in step S11, it activates a task of setting the control operation specification data table 21 in step S12. The activated task is executed in parallel with the schedular.

In steps S13 and S14, the CPU 54 activates a task of periodically performing transmission of data between the CPU 54 and the CPUs in the elevator control device 33 and in the floor control device 61 at a transmission timing with these CPUs. The activated task is executed in parallel with the scheduler.

Next, in step S15 to S17, the CPU 54 activates a group management control task including the elevator group management control means 13 and a learning control task including the elevator learning control means 15, if they are not active.

The operation specification data setting task constitutes the setting/non-setting determination means 26, and, together with the program executed by the laptop personal computer 70, constitutes the control operation specification data setting means 27.

Figure 5A:
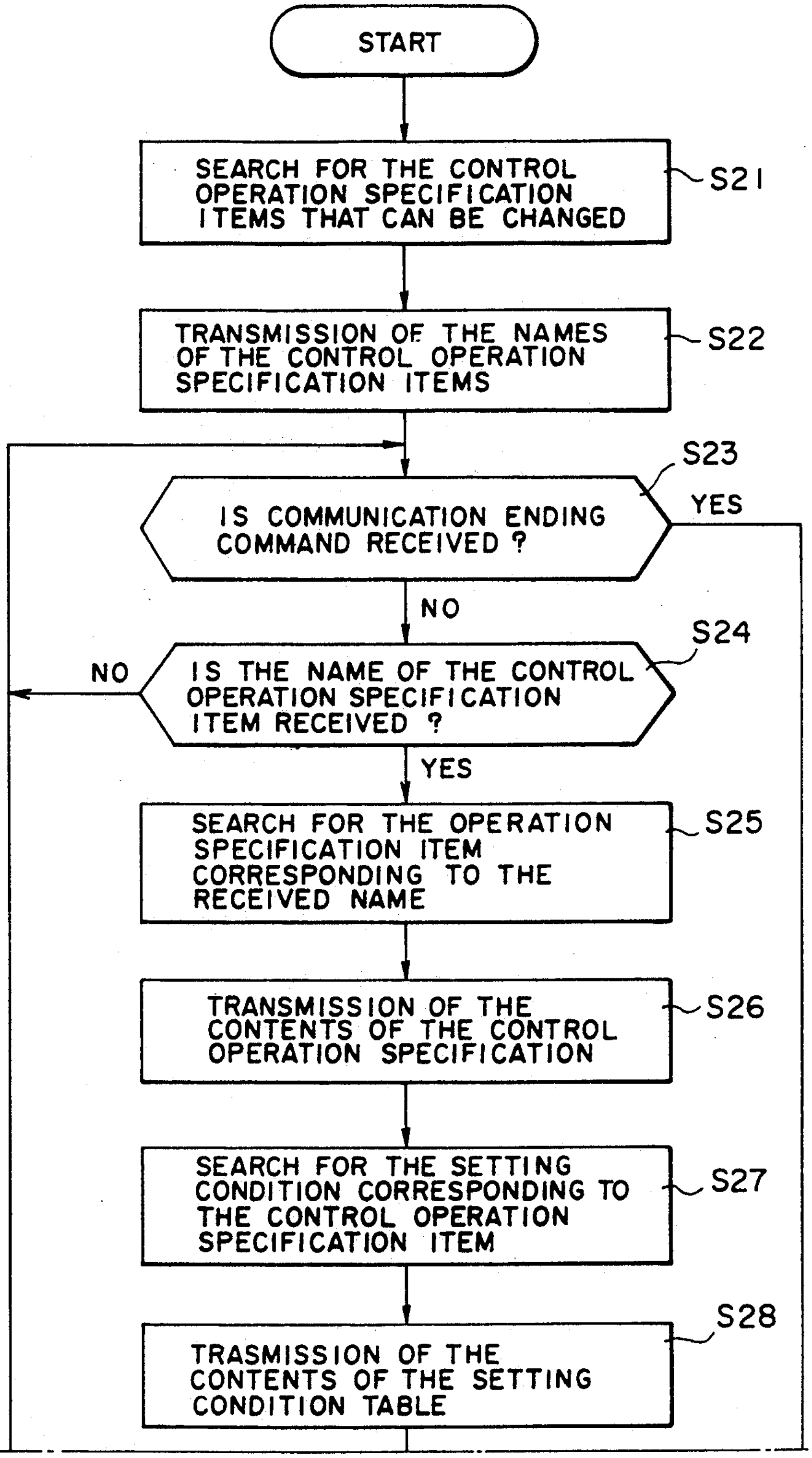
FIGS. 5A and 5B are flowcharts of an operation specification data setting task operation which is executed in the embodiment of FIGS. 2A and 2B.
Figure 5:
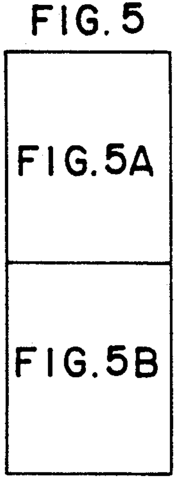
Figure 5B:
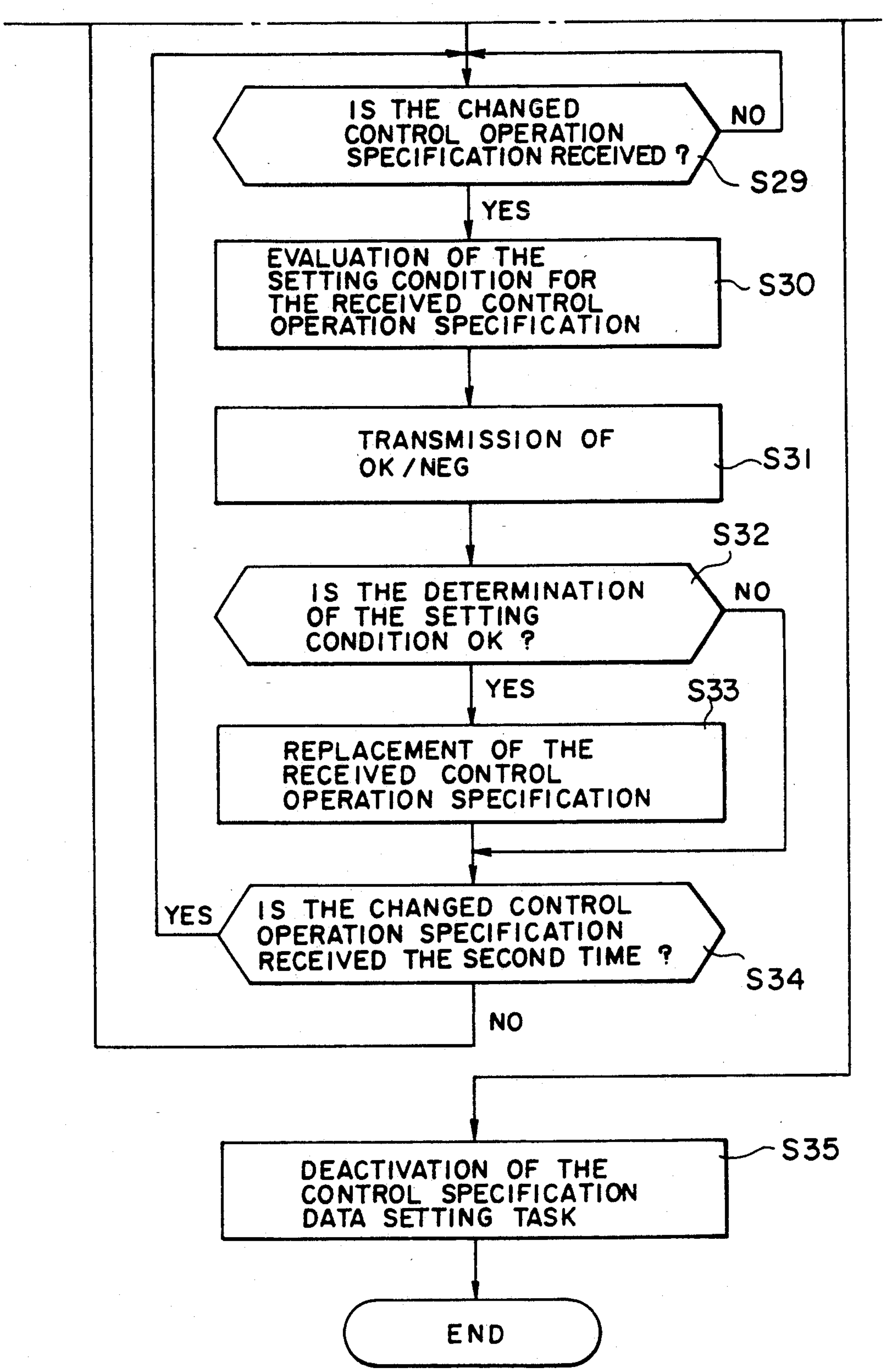

Next, the operation of the operation specification data setting task will be described below with reference to FIG. 5.

In step S21, the CPU 54 searches the control operation specification data set in the control operation specification data table 21 for the names of the control operation specification items which correspond to the key Nos. that are set as "yes" in the alteration range data table and takes them out.

The control operation specification data table 21 stored in the storage device 55 is tabulated in the form shown in Table 1 so that it can be referred to by the program.

TABLE 1

| | Control operation specification data table | |
|---|---|---|
| Key No. | Control operation specification item | Contents |
| 001 | Riding capacity | Value a |
| ∫ | ∫ | ∫ |
| 011 | Rated speed | Value b |

TABLE 1-continued

| Control operation specification data table | | |
|---|---|---|
| Key No. | Control operation specification item | Contents |
| 012 | Acceleration | Value c |
| ∫ | ∫ | ∫ |
| 021 | Number of stoppages | Value d |
| ∫ | ∫ | ∫ |
| 031 | Number of cars | Value e |
| ∫ | ∫ | ∫ |
| 101 | Separate operation for special visitors | Value f |
| ∫ | ∫ | ∫ |
| 111 | Rush hour operation service | Value g |
| ∫ | ∫ | ∫ |
| 200 | ∫ | ∫ |

As shown in Table 1, the control operation specification data table 21 contains a column for the key Nos. used by the CPU 54 when it refers to this control operation specification data table 21, a column for the names of the control operation specification items corresponding to the key Nos., and a column for the contents of the control operation specification.

In the column for the names of the control operation specification items are recorded names so as to allow the user to determine the contents thereof by reading them.

Value a recorded in the column for the contents of the contents of the control operation specification corresponds to the riding capacity of an elevator, and represents any value from 1 to 20. In this embodiment, value a is 15.

Value b corresponds to the rated speed of an elevator, and represents any value from 30 to 600 (m/min). In this embodiment, it is 180 (m/min).

Value c corresponds to the acceleration of an elevator, and represents any value from 0.7 to 1.2 (m/sec$^2$). In this embodiment, it is 0.8 (m/sec$^2$).

Value d which indicates the number of stoppages represents any value from 2 to 100 (floors). In this embodiment, it is 20 (floors).

Value e corresponds to the number of cars, and represents any value from 2 to 8 (cars). In this embodiment, it is 4 (cars).

Value f which denotes the separate operation function for a special visitor represents the number in the detailed specification table (not shown) which corresponds to this function. In the case where this function is operable, "1" is appended to value f. If the function is inoperable, "0" is appended to value f. In this embodiment, "0" is appended.

The detailed specification table is one used when there are many items in the control operation specification. The detailed specification table has the same form as that of Table 1. In the detailed specification table, a plurality of key Nos. are set for each item. For example, in the case of the rush hour operation service, the number of cars to be returned, the starting time, ending time, the number of floors which serve as the main floors during the rush hour operation service and so on are designated.

Value g which denotes the rush hour operation function represents the number in the detailed specification table which corresponds to this function. "1" is appended to value g if this function is operable. "0" is appended in a case where the function is inoperable. In this embodiment, "1" is appended.

The control operation specification data table 21 shown in Table 1 is stored in the RAM in the storage device 55 so that the contents thereof can be changed. The RAM containing this control operation specification data table 21 is backed up by temporary battery-power supplies.

The alteration range data table, in which items of the control operation specification that can be altered are set, is tabulated in the form shown in Table 2, so that it can be referred to by the program, like the control operation specification data table 21. The alteration range data table is stored in the ROM in the storage device 55.

TABLE 2

| Alteration range data table | |
|---|---|
| Key No. | Yes or no |
| 001 | No (riding capacity) |
| ∫ | ∫ |
| 011 | No (rated speed) |
| 012 | Yes (acceleration) |
| ∫ | ∫ |
| 021 | No (number of stoppages) |
| ∫ | ∫ |
| 031 | No (number of cars) |
| ∫ | ∫ |
| 101 | No. (separate operation for honored guest) |
| ∫ | ∫ |
| 111 | Yes (rush hour operation service) |
| ∫ | ∫ |
| 200 | ∫ |

The alteration range data table shown in Table 2 indicates whether or not the contents of the control operation specification data table 21 can be altered by a customer. The key Nos. in the alteration range data table correspond to the key Nos. in the control operation specification data table 21.

"Yes" indicates that the data can be changed by a customer, and "no" denotes that the data cannot be changed by the customer.

Key No. 012 has "yes", so the acceleration can be changed in the range from 0.7 to 1.2 m/sec$^2$.

Key No. 001 is listed as "no", which means that it cannot be altered. Change in the riding capacity is prohibited for prevention of a danger.

Key No. 011 is "no", which means that it cannot be altered. An increase in the rated speed is dangerous.

Key No. 021 is "no", and cannot be changed. The number of stoppages is determined for each building.

Key No. 031 is "no", and cannot be changed. The number of cars is dependent on the number of cars installed.

Key Nos. 101 to 200 indicate operability/inoperability of the optional functions. The separate operation for a special visitor corresponding to Key No. 101 is null because it is the specification which is not purchased by the customer. The rush hour operation function corresponding to key No. 111 is "yes".

In order to prepare a setting condition data table which contains all types of setting conditions and thereby standardize the program, the setting condition data table 21, which will be described in detail later, contain the setting conditions of some data which are listed as "no" in the alteration range data table.

In step S22, the CPU 54 transmits to the laptop personal computer 70 through the serial transmission device 57 all the names of the operation specification items which have been taken out from the control operation specification data table 21, and then executes the processing from step S24 to step S34 repeatedly until it receives a communication end command in step S23.

Once the CPU 54 receives the name of the operation specification item that the laptop personal computer 70 has transmitted in step S24, it refers to the control operation specification data table 21 in step S25 to search for the operation specification item corresponding to the name of the operation specification item received, and then transmits it together with the name of the operation specification item to the laptop personal computer 70 through the serial transmission device 57 in step S26.

At that time, if there exists a detailed specification table (not shown) corresponding to the operation specification item taken out from the control operation specification data table, the CPU 54 also takes that out and sends the contents of the detailed specification table.

Next, in step S27, the CPU 54 refers to the setting condition data table 25 on the basis of the key No. of the operation specification item that the CPU 54 has received from the personal computer 70 in step S24 to take out the setting condition corresponding to the operation specification item, and then transmits the contents (conditional equations) of the setting condition data table which have been taken out to the laptop personal computer 70 through the serial transmission device 57 in step S28.

The contents of the setting condition data table are stored in the ROM in the storage device 55 in the form of a table such as that shown in Table 3, so that they can be referred to by the program.

TABLE 3

Setting condition data table

| Condition No. | Key No. | Conditions |
|---|---|---|
| 001 | 012 | Conditional equation A |
| ∫ | ∫ | ∫ |
| 011 | 101 | Conditional equation B |
| 012 | 111 | Conditional equation C |
| ∫ | ∫ | ∫ |
| 100 | ∫ | ∫ |

The setting condition data table 25 contains a column for the condition Nos. used when the CPU 54 refers to the setting condition data table 25, a column for the key Nos. of the control operation specification item corresponding to the condition Nos. and a column for the setting conditions of the control operation specification.

The conditional equations set in the column for the conditions are described in the form of an equation or a program language that can be processed by the program.

Conditional equation A corresponds to the acceleration of the elevator, and sets the model of the lifting motor required in accordance with the set acceleration.

The condition when the acceleration is equal to or greater than 1.0 $m/sec^2$ is that key No. 002 is either M100, M200 or M300.

The condition when the acceleration is equal to or greater than 1.1 $m/sec^2$ is that key No. 002 is either M200 or M300.

The condition when the acceleration is equal to or greater than 1.2 $m/sec^2$ is that key No. 002 is M300.

M100 to M300 represents the model of the lifting motor. The greater the value, the greater the output.

Conditional equation C corresponds to the rush hour operation function, and condition No. 012 corresponds to the detailed specification table for the rush hour operation service. Conditional equation C is divided into the operation specification items expressed by Nos. 1 to 5.

No. 1 represents the operability/inoperability of the rush hour operation service, and does not require any condition.

No. 2 indicates the number of elevators which are to be returned. The condition for No. 2 differs in accordance with the number of elevators installed. Condition when the number of elevators which are to be returned is 2 or more is that key No. 031 is 4 or more, and that the average waiting time during the rush hour operation service is 30 seconds or less. The condition when the number of elevators is 3 or more is that key No. 031 is 5 or more, and that the average waiting time during the rush hour operation service is 28 seconds or less. The condition when the number of elevators is 4 or more is that key No. 031 is 6 or more, and that the average waiting time during the rush hour operation service is 25 seconds or less. In this way, when the number of cars that are returned to the main floor is large, the waiting time at other floors is decreased. The larger the number of cars that are installed and the shorter the average waiting time, the larger the value of No. 2.

No. 3 represents the starting time of the rush hour operation service, and does not require any condition.

No. 4 represents the ending time of the rush hour operation service, and does not require any condition.

No. 5 indicates that the number of main floors is less than the number of floors that the elevator is stopped.

The condition for No. 5 is that the number of main floors is less than the value obtained by key No. $021 \times 1/5$ (fraction is raised).

The contents of the setting condition data table 25 are transmitted to and displayed by the laptop personal computer 70. When an error of input of the control operation specification is displayed, the operator can perform input operation again.

Once the CPU 54 receives in step S29 the control operation specification which has been changed by and transmitted from the laptop personal computer 70, it refers to the condition equation in the setting condition data table 25 corresponding to the control operation specification changed by the personal computer 70 in step S30 to evaluate it on the basis of the required data obtained from the control operation specification data table 21, the elevator group management control means 13 and the elevator learning control means 15.

The data obtained from the elevator group management control means 13 includes the elevator operation pattern being selected at that time, the registered state of the floor calls, the registered state of the car calls, and the states of the cars. The data obtained from the elevator learning control means 15 includes the past average waiting time for each direction and each floor, the past number of passengers that ride the elevator for each direction and each floor, the past number of passengers that leave the elevator for each direction and each floor, the past average period of time during which an operation pattern is selected, the statistically estimated time of an operation pattern, the statistically estimated amount of traffic for each hour, and so on.

In step S31, the CPU 54 transmits to the laptop personal computer 70 "OK" when all the associated conditional equations are satisfied and, together with the evaluation results of the conditional equations, "NEG" when there is even one conditional equation that cannot be satisfied.

Once the setting conditions are satisfied, the CPU 54 allows the laptop personal computer 70 to display it.

When the setting conditions are not satisfied, the CPU 54 informs the personal computer 70 of an input error without changing the contents of the control operation specification data table 21 and allows it to display it.

Once it is determined in step S32 that the results of the determination is "OK", the CPU 54 accepts the request of the personal computer 70 and rewrites the contents of the control operation specification data table 21 in step S33.

Rewriting of the control operation specification is performed by referring the control operation specification data table 21 by means of the control operation specification item corresponding to the name of the control operation specification item and then replacing the control operation specification data in the control operation specification data table 21 with a changed control operation specification.

Among the contents of the control operation specification data table 21 which have been reset by the aforementioned operation, the data required by the group management control device 51 are referred to by the elevator group management control means 13 and the elevator learning control means 15 when they perform operations.

The data required by the floor control device 61 are output to the floor control device 61 through the transmission device 57 so that the control means (not shown) of the floor control device 61 can refer to them when it performs operations.

The control operation specification data required by the elevator control device 33 and the car top control device 45 are output from the serial transmission device 56 to the elevator control means 11 through the serial transmission device 36, and then to the control means (not shown) of the car top control device 45 through the serial transmission device 37. In this way, the control operation specification can be changed or corrected by the group management control device 51 alone, and the operability can be further improved. Furthermore, setting errors are decreased, and the reliability is thereby improved.

Once the CPU 54 receives the changed or corrected control operation specification the second time in step S34, the processing returns to step S29, and the processes from step S29 to S34 are then repeated.

Once the CPU 54 receives a communication ending command in step S23, the processing goes to step S35 and the CPU 54 deactivates the active control operation specification data setting task, and thereby ends the resetting processing of the control operation specification data table 21.

Figures 6, 6A:
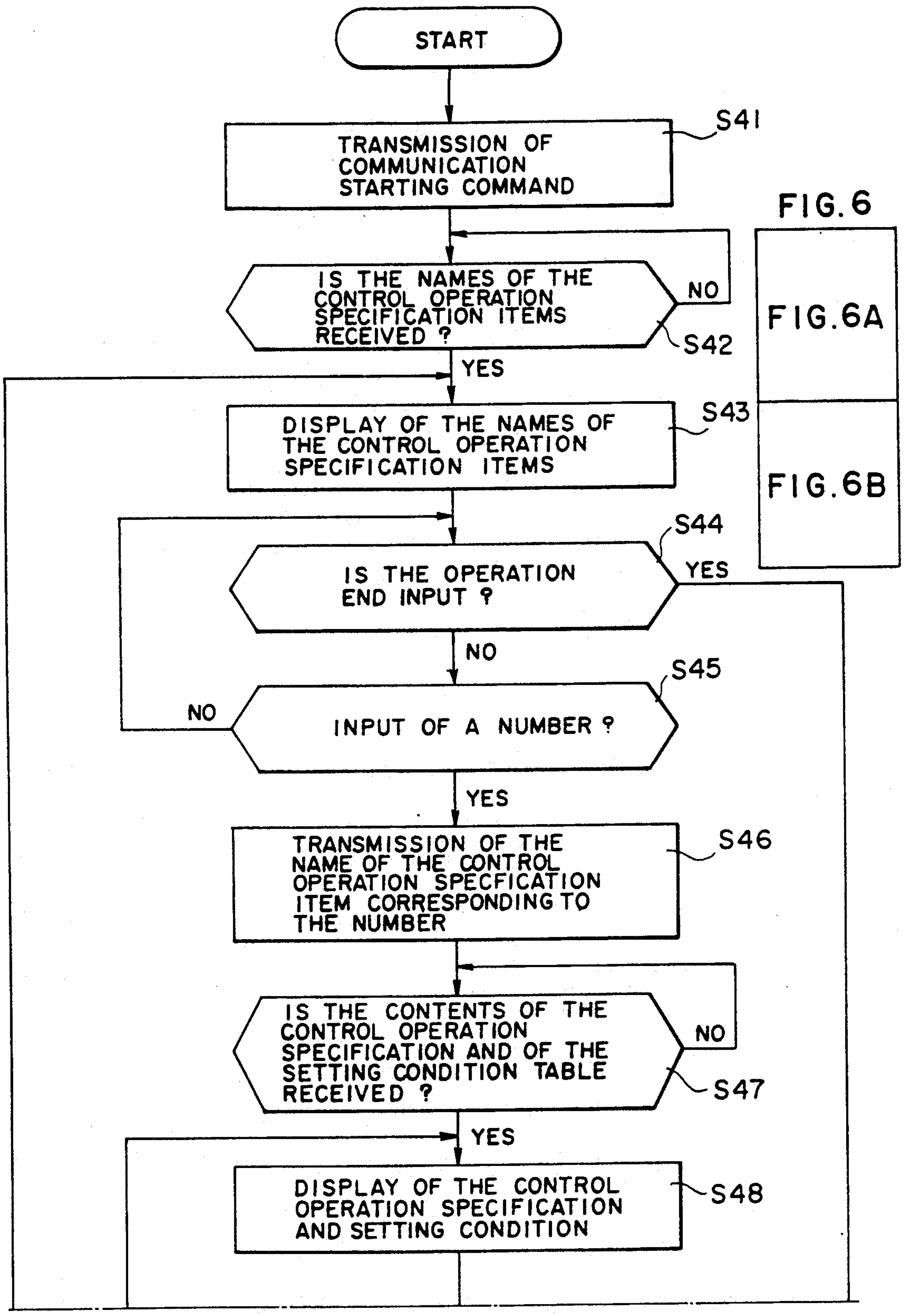
FIGS. 6A and 6B are flowcharts of the operation of an operation specification data setting means and that of a display control means which are executed in the embodiment of FIGS. 2A and 2B.
Figure 6B:
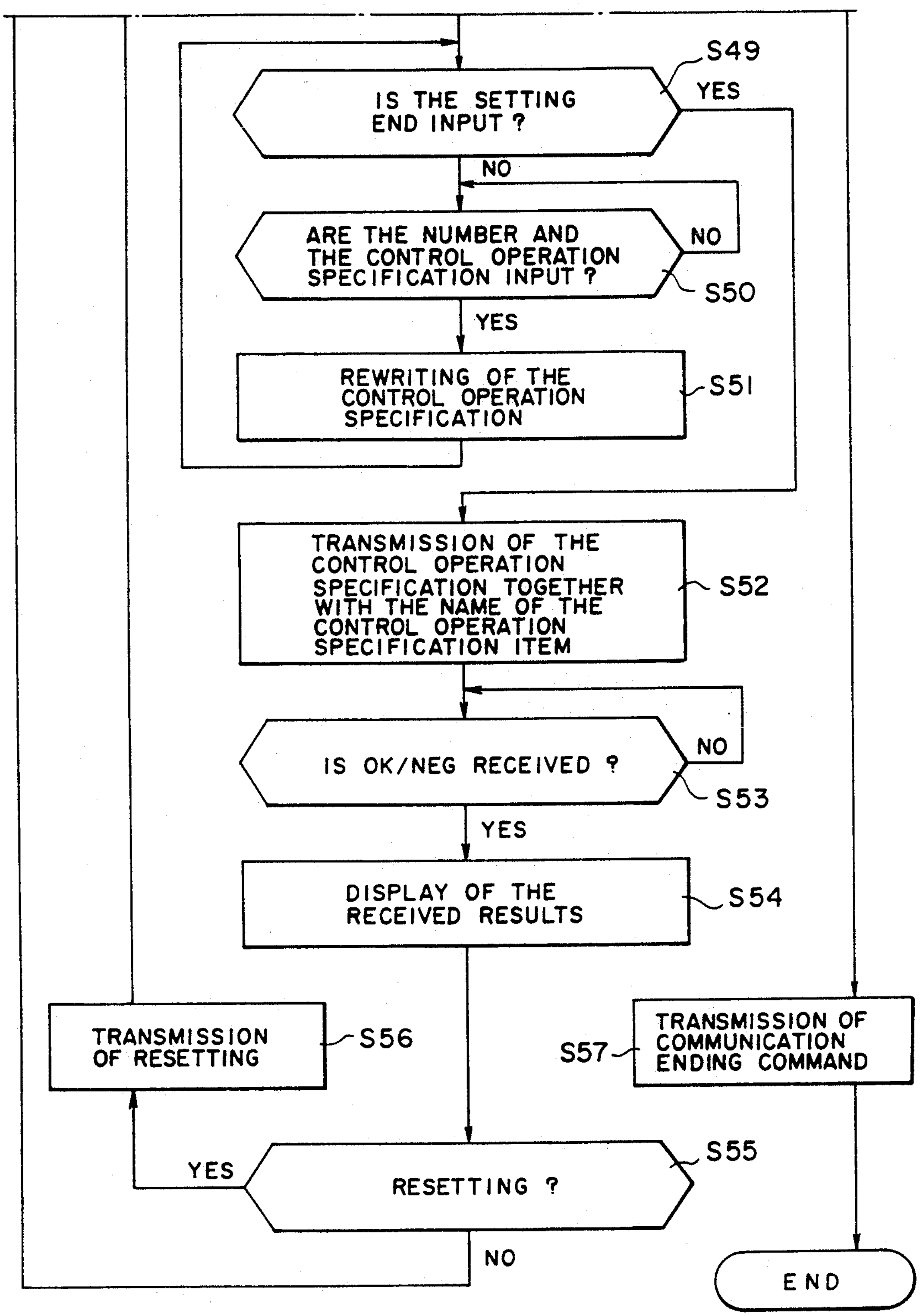

Next, the operation of the control operation specification data setting means 27 and that of the display control means 23, which are realized by the laptop personal computer 70, will be described with reference to FIG. 6.

The laptop personal computer 70 exchanges data with the CPU 54 in the group management control device 51 to reset the control operation specification. Data is entered to the laptop personal computer 70 interactively.

In step S41, the laptop personal computer 70 transmits a communication starting command to the CPU 54 of the group management control device 51 through the serial transmission device 57.

Figure 7:
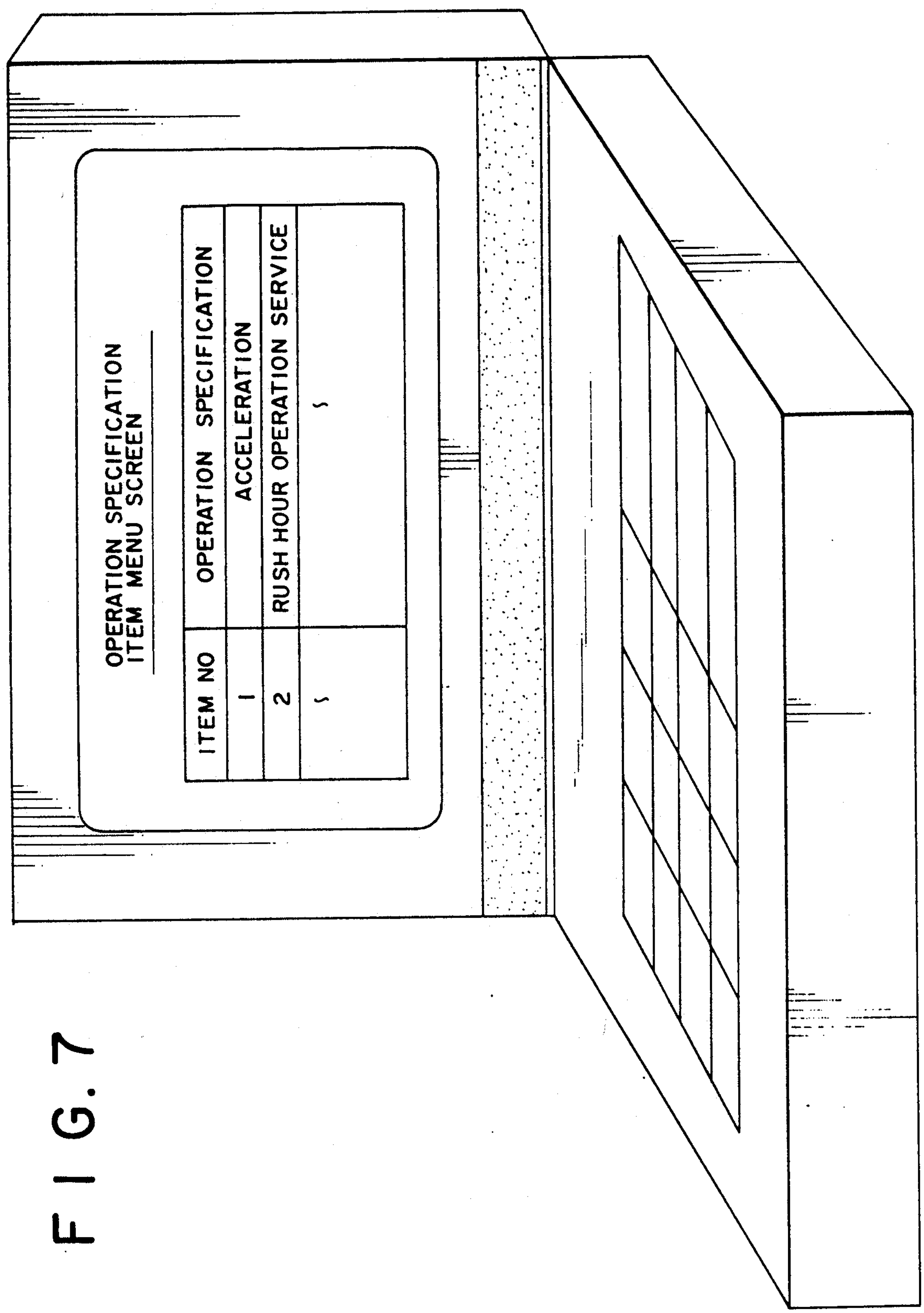
FIG. 7 shows an example of an operation specification item menu screen.

Once the personal computer 70 receives the names of the control operation specification items that can be changed from the CPU 54 of the group management control device 51 through the serial transmission device 57 in step S42, it displays an operation specification item menu such as that shown in FIG. 7 in step S43. The operation specification item menu is a list in which the names of the operation specification items that can be changed are displayed with a single item No. opposite each.

The displayed names of the control operation specification items that can be changed are those of the control operation specification items in all the operation specification items listed in the control operation specification data table 21 that are listed as "yes" in the alteration range data table (see Table 2).

Next, the personal computer 70 repeatedly executes the processings from step S43 to S56 until an operation end is input in step S44.

The operator selects the control operation specification item that he or she desires to change from the control operation specification items displayed on the CRT and inputs the input No. thereof and the contents of the alteration from a keyboard (not shown).

Once the item No. corresponding to the desired control operation specification item selected from the operation specification item menu has been input form the keyboard in step S45, the personal computer 70 transmits the name of the control operation specification item corresponding to the input item No. to the CPU 54 of the group management control device 51 through the serial transmission device 57 in step S46.

Figure 8:
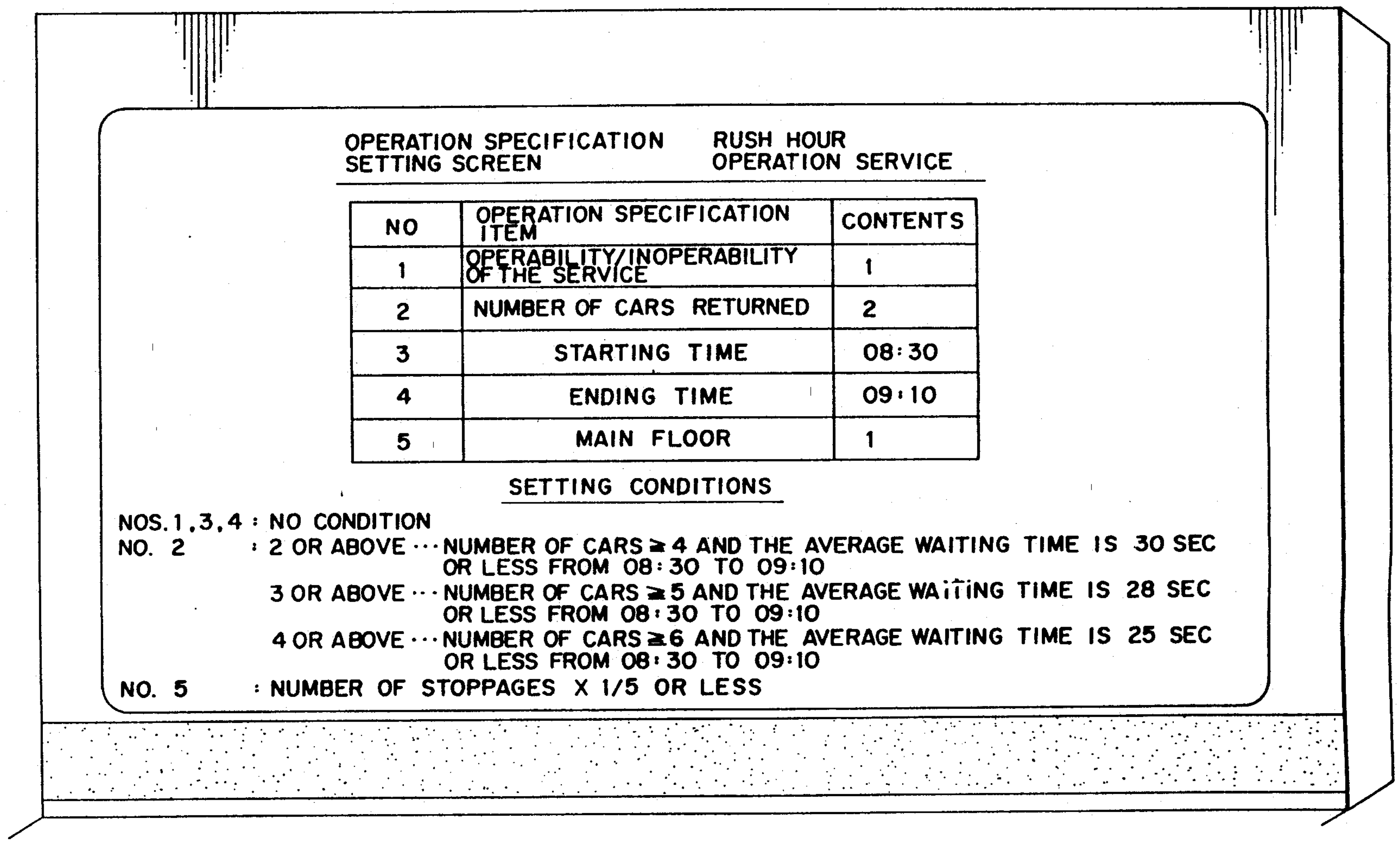
FIG. 8 shows an example of an operation specification setting screen.

Once the personal computer 70 receives the control operation specification data and the setting condition data corresponding to the name of the control operation specification item which has been transmitted to the CPU 54 from the CPU 54 of the group management control device 51 in step S47, it displays the received control operation specification data and the setting condition data on the CRT in a form shown in FIG. 8 in step S48.

FIG. 8 shows the operation specification data on the rush hour operation service which are read out from the detailed specification table.

The operability/inoperability of the rush hour operation service is "1", i.e., the rush hour operation service is operable, immediately after the installation of the elevator.

In the item of the number of cars to be returned [2 to 4], a number of cars that are returned to the main floor is set in a range from 2 to 4. In the item of the starting time, the starting time of the rush hour operation service is set, like 8:30. In the item of the ending time of the rush hour operation service, the ending time is set, like 9:10. In the item of the main floor, the floor which serves as the main floor during the rush hour operation service is set.

The contents of the control operation specification may be changed by the operator, as shown by, for example, the control operation specification setting screen shown in FIG. 8, and the changed contents are output to the CPU 54.

The personal computer 70 executes the processings of steps S50 and S51 until the setting end is input in step S49, and thereby changes the control operation specification shown in FIG. 8 in accordance with the No. and the contents of the specification to be changed which are input from the keyboard.

Once the setting end is input in step S49, the personal computer 70 transmits the contents of the specification that are changed together with the name of the operation specification item to the CPU 54 of the group management control device 51 through the serial transmission device 57 in step S52.

Once the personal computer 70 receives the results of the determination indicating whether or not the change meets the setting condition which is made by the CPU 54 of the group management control device 51 in step S53, it displays the received results of the determination on the CRT in step S54.

When the personal computer 70 receives "OK" as the results of the determination, which means that the contents that have been changed meet the setting condition, it displays "The change has been set."

When the personal computer 70 receives "NEG" as the results of the determination, which means that the contents that have been changed do not meet the setting condition, it displays "Set again."

If it is determined in step S55 that the contents that are to be changed are set again, the personal computer 70 transmits the data indicating that the contents will be set again to the CPU 54 of the group management control device 51 in step S56, and then returns to the processing of step S48.

If the results of the determination received in step S53 are not "NEG", it is determined that there is no resetting, and the processing returns from step S55 to step S43. Thereafter, the processings from steps S44 to S56 are repeated until the change is ended. Once the change has been ended, the personal computer 70 transmits the communication ending command to the CPU 54 in the group management control device 51 through the serial transmission device 57 in step S57.

In the present embodiment, the display device 24 is arranged such that it simply displays the specification setting condition data. However, in a case where the input does not satisfy the setting condition, the display device 24 may also display what the value is that does not satisfy the condition and how the condition can be satisfied for the users' convenience.

Furthermore, a switch may be employed as the input means of the change instruction in place of the laptop personal computer. In that case, the control operation specification data setting means 27 is constructed by the CPU 54 in the group management control device 51.

Furthermore, in the present embodiment, although the control operation specification data table 21 and the specification setting condition data table 25 are stored in and changed by the group management control device 51, they may be respectively provided in the elevator control device 33, the car top control device 45 and the floor control device 61 so that they can be changed by the laptop personal computer 70 which is connected to these devices.

Furthermore, in order to cope with the case in which the number of elevators installed is increased after the installation of the system or the case in which the number of service floors is increased, the contents of the control operation specification data table 21, the specification setting condition data table 25 and the alteration range data table may be stored in a RAM, so that they can be reset not in a plant but by the operator of the maintenance company using a specially prepared program.

Furthermore, in the present embodiment, the control operation specification data table 21 is stored in the RAM which is backed up by the battery-power supplies so as to prevent destruction of the contents on the removal of power to the RAM. However, $E^2PROM$ or a non-volatile RAM may also be employed.

What is claimed is:

1. An apparatus for setting a control operation specification for an elevator comprising:

operation specification storage means for storing a plurality of operation specifications used to control the elevator;

alteration range data storage means for storing alteration range data indicating which of the operation specifications can be reset;

setting condition storage means for storing setting conditions for the operation specifications that can be reset;

display means for displaying the operation specifications that can be reset as well as the setting conditions corresponding to the operation specifications that can be reset;

input means for enabling a human operator to select one of the operation specifications and to input a new value for the selected operation specification;

determination means for determining whether or not the selected operation specification is one of the operation specifications that can be reset based on the alteration range data and whether the selected operation specification can be reset to the new value input by the operator based on the setting condition for the selected operation specification stored in the setting condition storage means and a current value of the selected operation specification; and resetting means for resetting the selected operation specification stored in the operation specification storage means to the new value input by the operator only when the determination means determines that the selected operation specification is one of the operation specifications that can be reset and that the selected operation specification can be reset to the new value.

2. An apparatus for setting a control operation specification for an elevator according to claim 1, wherein said operation specification storage means contains said plurality of operation specifications in the form of a table.

3. An apparatus for setting a control operation specification for an elevator according to claim 1, wherein said setting condition storage means contains said setting conditions in the form of a table.

4. An apparatus for setting a control operation specification for an elevator according to claim 1, wherein the display means and the input means comprise a laptop personal computer.

5. An apparatus for setting operation specifications for an elevator comprising:

a storage device for storing operation specifications used to control the elevator and for storing setting condition data and alteration range data indicating which operation specifications in the storage device can be altered;

a transmission device for receiving new operation specifications;

a CPU, coupled to the storage device and the transmission device, for updating the operation specifications stored in the storage device with the new operation specifications received from the transmission device provided that the alteration range data indicates that the new operation specifications are for updating operation specifications in the storage device which can be altered and provided that the new operation specifications are within a predetermined range specified by the setting condition data stored in the storage device wherein the CPU, the storage device, and the transmission device comprise a group management control device.

6. An apparatus for setting operation specifications as recited in claim 5 including a computer, coupled to the transmission device, for displaying an operation specification to be changed.

7. An apparatus for setting operation specifications as recited in claim 6, wherein the computer displays an operation specification setting screen.

8. An apparatus for setting operation specifications as recited in claim 7, wherein the CPU reads setting condition data from the storage device and transmits the setting condition data through the transmission device for display on the computer.

9. An apparatus for setting operation specifications as recited in claim 5, wherein the storage device includes a means for changing the setting condition data electronically.

10. An apparatus for setting operation specifications as recited in claim 5, including an elevator control device, coupled to the group management control device, wherein the elevator control device receives new operation specifications from the group management control device.

11. An apparatus for setting operation specifications as recited in claim 5, including a car top control device, coupled to the group management control device, wherein the car top control device receives new operation specifications from the group management control device.

12. An apparatus for setting operation specifications as recited in claim 5, wherein the group management control device communicates with other control devices using serial data transmission.

13. An apparatus for setting operation specifications as recited in claim 5, wherein the setting condition data includes acceleration data.

14. An apparatus for setting operation specifications as recited in claim 5, wherein the setting condition data includes rated speed data.

15. An apparatus for setting operation specifications as recited in claim 5, wherein the setting condition data includes rush hour operation service specification data.

16. An apparatus for setting operation specifications as recited in claim 5, wherein the transmission device transmits data serially.

* * * * *